United States Patent
Giovanardi et al.

(10) Patent No.: US 9,440,507 B2
(45) Date of Patent: Sep. 13, 2016

(54) CONTEXT AWARE ACTIVE SUSPENSION CONTROL SYSTEM

(71) Applicant: Levant Power Corporation, Woburn, MA (US)

(72) Inventors: Marco Giovanardi, Melrose, MA (US); Jonathan R. Leehey, Wayland, MA (US); Johannes Schneider, Cambridge, MA (US); Zackary Martin Anderson, Cambridge, MA (US)

(73) Assignee: Levant Power Corporation, Woburn, MA (US)

( * ) Notice: Subject to any disclaimer, the term of this patent is extended or adjusted under 35 U.S.C. 154(b) by 0 days.

(21) Appl. No.: 14/242,715

(22) Filed: Apr. 1, 2014

(65) Prior Publication Data

US 2014/0297119 A1 Oct. 2, 2014

Related U.S. Application Data

(63) Continuation of application No. PCT/US2014/029654, filed on Mar. 14, 2014.

(60) Provisional application No. 61/913,644, filed on Dec. 9, 2013, provisional application No. 61/865,970, filed (Continued)

(51) Int. Cl.
*B60G 15/10* (2006.01)
*B60G 17/02* (2006.01)
(Continued)

(52) U.S. Cl.
CPC ......... *B60G 17/016* (2013.01); *F15B 13/0444* (2013.01); *F16K 11/065* (2013.01);
(Continued)

(58) Field of Classification Search
CPC .................. B60G 17/0162; B60G 2400/0511; B60G 2400/0521; B60G 2204/4605; B60G 2400/64; B60G 2800/915; B60G 2202/413; B60G 2800/214; B60W 10/22; B60W 30/025; B60W 2720/18; B60W 10/188; B60T 2260/06; B60T 8/172; B60T 8/17551; B60T 8/17554; B60T 8/243
See application file for complete search history.

(56) References Cited

U.S. PATENT DOCUMENTS

| | | | |
|---|---|---|---|
| 998,128 | A | 7/1911 | Smith |
| 1,116,293 | A | 11/1914 | Kane |
| 1,290,293 | A | 1/1919 | Morski |
| 2,194,530 | A | 3/1940 | Torstensson |

(Continued)

FOREIGN PATENT DOCUMENTS

| | | |
|---|---|---|
| CN | 1325799 A | 12/2001 |
| CN | 1370926 A | 9/2002 |

(Continued)

OTHER PUBLICATIONS

Cleasby et al., A novel high efficiency electrohydrostatic flight simulator motion system. Fluid Pow Mot Control. Centre for PTMC, UK. 2008;437-449.

(Continued)

*Primary Examiner* — James Trammell
*Assistant Examiner* — Demetra Smith-Stewart
(74) *Attorney, Agent, or Firm* — Wolf, Greenfield & Sacks, P.C.

(57) ABSTRACT

A method for reducing power consumption in an active suspension system through the selective use of high performance, associated with high power demand, only in situations instantaneously deemed to provide a high ratio of benefit to cost. Input events are classified ahead of time, and are identified during operation of the system, ahead of time if possible through the use of look-ahead sensing or statistical analysis, or at the beginning of the event through the use of motion sensing. Once an event is detected, an estimation of the cost and benefits for an intervention of the active suspension system is made, and the intervention is scaled in a way to provide a good compromise. Relying on the nonlinearity of the cost and benefit expressions, this leads to overall reduced power consumption with small loss in perceived benefit.

40 Claims, 8 Drawing Sheets

Related U.S. Application Data on Aug. 14, 2013, provisional application No. 61/815,251, filed on Apr. 23, 2013, provisional application No. 61/789,600, filed on Mar. 15, 2013, provisional application No. 61/930,452, filed on Jan. 22, 2014.

(51) Int. Cl.
   *B60G 17/016*    (2006.01)
   *B60G 17/018*    (2006.01)
   *F15B 13/044*    (2006.01)
   *F16K 11/065*    (2006.01)
   *F16K 31/12*     (2006.01)

(52) U.S. Cl.
   CPC .............. *F16K 31/12* (2013.01); *B60G 15/10* (2013.01); *B60G 2202/413* (2013.01); *B60G 2204/11* (2013.01); *B60G 2400/0511* (2013.01); *B60G 2400/0521* (2013.01); *B60G 2400/60* (2013.01); *B60G 2800/70* (2013.01)

(56) References Cited

U.S. PATENT DOCUMENTS

| | | | |
|---|---|---|---|
| 2,885,202 A | 5/1959 | Trumper et al. | |
| 2,958,292 A | 11/1960 | Lipe et al. | |
| 3,507,580 A | 4/1970 | Howard et al. | |
| 3,515,889 A | 6/1970 | Kammerer | |
| 3,559,027 A | 1/1971 | Arsem | |
| 3,688,859 A | 9/1972 | Hudspeth et al. | |
| 3,800,202 A | 3/1974 | Oswald | |
| 3,803,906 A | 4/1974 | Ross | |
| 3,805,833 A | 4/1974 | Teed | |
| 3,921,746 A | 11/1975 | Lewus | |
| 3,947,004 A | 3/1976 | Taylor | |
| 4,032,829 A | 6/1977 | Schenavar | |
| 4,033,580 A | 7/1977 | Paris | |
| 4,216,420 A | 8/1980 | Jinbo et al. | |
| 4,295,538 A | 10/1981 | Lewus | |
| 4,401,926 A | 8/1983 | Morton et al. | |
| 4,480,709 A | 11/1984 | Commanda | |
| 4,500,827 A | 2/1985 | Merritt et al. | |
| 4,606,551 A | 8/1986 | Toti et al. | |
| 4,625,993 A | 12/1986 | Williams et al. | |
| 4,673,194 A | 6/1987 | Sugasawa | |
| 4,729,459 A | 3/1988 | Inagaki et al. | |
| 4,740,711 A | 4/1988 | Sato et al. | |
| 4,815,575 A | 3/1989 | Murty | |
| 4,857,755 A | 8/1989 | Comstock | |
| 4,872,701 A | 10/1989 | Akatsu et al. | |
| 4,887,699 A | 12/1989 | Ivers et al. | |
| 4,908,553 A | 3/1990 | Hoppie et al. | |
| 4,921,080 A | 5/1990 | Lin | |
| 4,924,393 A | 5/1990 | Kurosawa | |
| 4,936,423 A | 6/1990 | Karnopp | |
| 4,981,309 A | 1/1991 | Froeschle et al. | |
| 5,034,890 A | 7/1991 | Sugasawa et al. | |
| 5,046,309 A | 9/1991 | Yoshino et al. | |
| 5,060,959 A | 10/1991 | Davis et al. | |
| 5,091,679 A | 2/1992 | Murty et al. | |
| 5,098,119 A | 3/1992 | Williams et al. | |
| 5,102,161 A | 4/1992 | Williams | |
| 5,145,206 A | 9/1992 | Williams | |
| 5,203,199 A | 4/1993 | Henderson et al. | |
| 5,215,327 A | 6/1993 | Gatter et al. | |
| 5,232,242 A | 8/1993 | Bachrach et al. | |
| 5,243,525 A | 9/1993 | Tsutsumi et al. | |
| 5,276,622 A | 1/1994 | Miller et al. | |
| 5,291,960 A | 3/1994 | Brandenburg et al. | |
| 5,295,563 A | 3/1994 | Bennett | |
| 5,295,705 A | 3/1994 | Butsuen et al. | |
| 5,337,560 A | 8/1994 | Abdelmalek et al. | |
| 5,360,445 A | 11/1994 | Goldowsky | |
| 5,377,791 A | 1/1995 | Kawashima et al. | |
| 5,391,953 A | 2/1995 | Van de Veen | |
| 5,425,436 A | 6/1995 | Teramura et al. | |
| 5,480,186 A | 1/1996 | Smith | |
| 5,497,324 A | 3/1996 | Henry et al. | |
| 5,529,152 A | 6/1996 | Hamilton et al. | |
| 5,570,286 A | 10/1996 | Margolis et al. | |
| 5,572,425 A | 11/1996 | Levitt et al. | |
| 5,590,734 A | 1/1997 | Caires | |
| 5,608,308 A | 3/1997 | Kiuchi et al. | |
| 5,659,205 A | 8/1997 | Weisser et al. | |
| 5,682,980 A | 11/1997 | Reybrouck et al. | |
| 5,684,383 A | 11/1997 | Tsuji et al. | |
| 5,701,245 A | 12/1997 | Ogawa et al. | |
| 5,717,303 A | 2/1998 | Engel | |
| 5,764,009 A | 6/1998 | Fukaya et al. | |
| 5,794,168 A | 8/1998 | Sasaki et al. | |
| 5,794,439 A | 8/1998 | Lisniansky | |
| 5,839,800 A | 11/1998 | Koga et al. | |
| 5,856,709 A | 1/1999 | Ibaraki et al. | |
| 5,892,293 A | 4/1999 | Lucas | |
| 5,941,328 A | 8/1999 | Lyons et al. | |
| 5,944,153 A | 8/1999 | Ichimaru | |
| 5,987,368 A | 11/1999 | Kamimae et al. | |
| 5,999,868 A * | 12/1999 | Beno et al. .................. | 701/37 |
| 6,025,665 A | 2/2000 | Poag | |
| 6,049,746 A | 4/2000 | Southward et al. | |
| 6,092,618 A | 7/2000 | Collier-Hallman | |
| 6,111,375 A | 8/2000 | Zenobi | |
| 6,161,844 A | 12/2000 | Charaudeau et al. | |
| 6,190,319 B1 | 2/2001 | Goldowsky | |
| 6,227,817 B1 | 5/2001 | Paden | |
| 6,282,453 B1 | 8/2001 | Lombardi | |
| 6,290,034 B1 | 9/2001 | Ichimaru | |
| 6,314,353 B1 | 11/2001 | Ohsaku et al. | |
| 6,349,543 B1 | 2/2002 | Lisniansky | |
| 6,394,238 B1 | 5/2002 | Rogala | |
| 6,397,134 B1 * | 5/2002 | Shal et al. .................. | 701/37 |
| 6,441,508 B1 | 8/2002 | Hylton | |
| 6,452,535 B1 | 9/2002 | Rao et al. | |
| 6,502,837 B1 | 1/2003 | Hamilton et al. | |
| 6,519,517 B1 | 2/2003 | Heyring et al. | |
| 6,519,939 B1 | 2/2003 | Duff | |
| 6,559,553 B2 | 5/2003 | Yumita | |
| 6,575,484 B2 | 6/2003 | Rogala et al. | |
| 6,592,060 B1 | 7/2003 | Vomhof et al. | |
| 6,631,960 B2 | 10/2003 | Grand et al. | |
| 6,765,389 B1 | 7/2004 | Moore | |
| 6,876,100 B2 | 4/2005 | Yumita | |
| 6,908,162 B2 | 6/2005 | Obayashi et al. | |
| 6,920,951 B2 | 7/2005 | Song et al. | |
| 6,944,544 B1 | 9/2005 | Prakah-Asante et al. | |
| 6,952,060 B2 | 10/2005 | Goldner | |
| 6,964,325 B2 | 11/2005 | Maes | |
| 6,973,880 B2 | 12/2005 | Kumar | |
| 7,015,594 B2 | 3/2006 | Asada | |
| 7,023,107 B2 | 4/2006 | Okuda et al. | |
| 7,034,482 B2 | 4/2006 | Komiyama et al. | |
| 7,051,526 B2 | 5/2006 | Geiger | |
| 7,087,342 B2 | 8/2006 | Song | |
| 7,156,406 B2 | 1/2007 | Kraus et al. | |
| 7,195,250 B2 | 3/2007 | Knox et al. | |
| 7,198,125 B2 | 4/2007 | Skelcher et al. | |
| 7,206,678 B2 | 4/2007 | Arduc et al. | |
| 7,335,999 B2 | 2/2008 | Potter | |
| 7,336,002 B2 | 2/2008 | Kato et al. | |
| 7,392,998 B2 | 7/2008 | Runkel | |
| 7,421,954 B2 | 9/2008 | Bose | |
| 7,427,072 B2 | 9/2008 | Brown | |
| 7,513,490 B2 | 4/2009 | Robertson | |
| 7,533,890 B2 | 5/2009 | Chiao | |
| 7,656,055 B2 | 2/2010 | Torres et al. | |
| 7,722,056 B2 | 5/2010 | Inoue et al. | |
| 7,854,203 B2 | 12/2010 | Kumar | |
| 7,938,217 B2 | 5/2011 | Stansbury | |
| 7,963,529 B2 | 6/2011 | Oteman et al. | |
| 8,063,498 B2 | 11/2011 | Namuduri et al. | |
| 8,067,863 B2 | 11/2011 | Giovanardi | |
| 8,079,436 B2 | 12/2011 | Tikkanen et al. | |
| 8,080,888 B1 | 12/2011 | Daley | |
| 8,167,319 B2 | 5/2012 | Ogawa | |

(56) References Cited

U.S. PATENT DOCUMENTS

| | | |
|---|---|---|
| 8,255,117 B2 | 8/2012 | Bujak et al. |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,380,416 B2 | 2/2013 | Offerle et al. |
| 8,392,030 B2 | 3/2013 | Anderson et al. |
| 8,453,809 B2 | 6/2013 | Hall |
| 8,475,137 B2 | 7/2013 | Kobayashi et al. |
| 8,548,678 B2 | 10/2013 | Ummethala et al. |
| 8,590,679 B2 | 11/2013 | Hall |
| 8,596,055 B2 | 12/2013 | Kadlicko |
| 8,672,337 B2 | 3/2014 | van der Knaap et al. |
| 8,776,961 B2 | 7/2014 | Mori et al. |
| 8,820,064 B2 | 9/2014 | Six et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 8,892,304 B2 | 11/2014 | Lu et al. |
| 8,966,889 B2 | 3/2015 | Six |
| 9,108,484 B2 | 8/2015 | Reybrouck |
| 9,174,508 B2 | 11/2015 | Anderson et al. |
| 9,205,718 B2 | 12/2015 | Lee |
| 9,260,011 B2 | 2/2016 | Anderson et al. |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0083629 A1 | 5/2004 | Kondou |
| 2004/0096334 A1 | 5/2004 | Aldinger et al. |
| 2004/0119289 A1 | 6/2004 | Zabramny |
| 2004/0207350 A1 | 10/2004 | Wilton et al. |
| 2004/0211631 A1 | 10/2004 | Hsu |
| 2004/0212273 A1 | 10/2004 | Gould |
| 2005/0017462 A1 | 1/2005 | Kroppe |
| 2005/0121268 A1 | 6/2005 | Groves et al. |
| 2005/0178628 A1 | 8/2005 | Uchino et al. |
| 2005/0246082 A1 | 11/2005 | Miki et al. |
| 2005/0280318 A1 | 12/2005 | Parison et al. |
| 2006/0090462 A1 | 5/2006 | Yoshino |
| 2006/0178808 A1* | 8/2006 | Wu et al. ............ 701/124 |
| 2006/0239849 A1 | 10/2006 | Heltzapple et al. |
| 2007/0018626 A1 | 1/2007 | Chi |
| 2007/0021886 A1 | 1/2007 | Miyajima |
| 2007/0088475 A1 | 4/2007 | Nordgren et al. |
| 2007/0089919 A1 | 4/2007 | de la Torre et al. |
| 2007/0089924 A1 | 4/2007 | de la Torre et al. |
| 2007/0120332 A1 | 5/2007 | Bushko et al. |
| 2007/0170680 A1 | 7/2007 | van der Knaap et al. |
| 2007/0233279 A1 | 10/2007 | Kazerooni et al. |
| 2008/0004771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238004 A1 | 10/2008 | Turco et al. |
| 2008/0238396 A1 | 10/2008 | Ng et al. |
| 2008/0257626 A1 | 10/2008 | Carabelli et al. |
| 2009/0015202 A1 | 1/2009 | Miura et al. |
| 2009/0192674 A1* | 7/2009 | Simons ............ 701/37 |
| 2009/0212649 A1 | 8/2009 | Kingman et al. |
| 2009/0229902 A1 | 9/2009 | Stansbury |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1 | 3/2010 | Bavetta et al. |
| 2010/0115936 A1 | 5/2010 | Williamson et al. |
| 2010/0217491 A1* | 8/2010 | Naito et al. ............ 701/49 |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0057478 A1 | 3/2011 | van der Knaap et al. |
| 2011/0127127 A1 | 6/2011 | Hirao et al. |
| 2011/0162903 A1 | 7/2011 | Stragier |
| 2011/0303049 A1 | 12/2011 | Neelakantan et al. |
| 2012/0010780 A1 | 1/2012 | Hayashi et al. |
| 2012/0055745 A1 | 3/2012 | Buettner et al. |
| 2012/0067037 A1 | 3/2012 | Bohrer et al. |
| 2012/0078470 A1 | 3/2012 | Hirao et al. |
| 2012/0181757 A1 | 7/2012 | Oteman et al. |
| 2012/0230850 A1 | 9/2012 | Kawano et al. |
| 2012/0233991 A1 | 9/2012 | Ivantysynova et al. |
| 2012/0305347 A1* | 12/2012 | Mori et al. ............ 188/266.2 |
| 2013/0081382 A1 | 4/2013 | Nelson et al. |
| 2013/0147205 A1 | 6/2013 | Tucker et al. |
| 2013/0154280 A1 | 6/2013 | Wendell et al. |
| 2013/0221625 A1 | 8/2013 | Pare et al. |
| 2013/0264158 A1 | 10/2013 | Hall |
| 2014/0005888 A1 | 1/2014 | Bose et al. |
| 2014/0012467 A1 | 1/2014 | Knox et al. |
| 2014/0012468 A1 | 1/2014 | Le et al. |
| 2014/0095022 A1 | 4/2014 | Cashman et al. |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0271066 A1 | 9/2014 | Hou |
| 2014/0288776 A1 | 9/2014 | Anderson et al. |
| 2014/0294601 A1 | 10/2014 | O'Shea et al. |
| 2014/0294625 A1 | 10/2014 | Tucker et al. |
| 2014/0297113 A1 | 10/2014 | Zuckerman et al. |
| 2014/0297116 A1 | 10/2014 | Anderson et al. |
| 2014/0297117 A1 | 10/2014 | Near et al. |
| 2014/0346783 A1 | 11/2014 | Anderson et al. |
| 2015/0059325 A1 | 3/2015 | Knussman et al. |
| 2015/0192114 A1 | 7/2015 | Triebel et al. |
| 2015/0224845 A1 | 8/2015 | Anderson et al. |
| 2015/0316039 A1 | 11/2015 | Tucker et al. |
| 2016/0031285 A1 | 2/2016 | Tucker et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| CN | 101749353 A | 6/2010 |
| DE | 3937987 A1 | 5/1991 |
| DE | 195 35 752 A1 | 3/1997 |
| EP | 363158 A2 * | 4/1990 |
| EP | 1878598 | 1/2008 |
| EP | 2 131 072 A1 | 12/2009 |
| EP | 2 136 055 A1 | 12/2009 |
| EP | 2 541 070 A1 | 1/2013 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | S59-187124 A | 10/1984 |
| JP | H3-123981 U1 | 12/1991 |
| JP | H05-50195 U | 7/1993 |
| JP | 8-226377 A2 | 9/1996 |
| JP | 2001-311452 A | 9/2001 |
| JP | 2003/035254 | 2/2003 |
| JP | 2005-521820 | 7/2005 |
| JP | 2008-536470 A | 9/2008 |
| WO | WO 97/26145 A | 7/1997 |
| WO | WO 2007/071362 A1 | 6/2007 |
| WO | WO 2011/159874 A2 | 12/2011 |
| WO | WO 2012/167316 A1 | 12/2012 |

OTHER PUBLICATIONS

Shen et al., Automative electric power and energy mangement—a system approach. Business Briefing: Global Automotive Manufacturing and Technology. 2003:1-5.

(56) References Cited

OTHER PUBLICATIONS

Ride control innovation, accelerated$^{SM}$ Forward thinking. Forward moving. ACOCAR. Tenneco. Sep. 2011.

Kaminaga et al., Mechanism and Control of knee power augmenting device with backdrivable electro-hydrostatic actuator. 13th World congress Mechanism Machine Science. Jun. 19-25, 2011. 1-10.

* cited by examiner

FIG. 2

| Event Type | Intervention Benefit | Intervention Cost | Performance Factor |
|---|---|---|---|
| Smooth Road | 5 | 30 | 6 |
| Medium Roughness Road | 8 | 40 | 4 |
| Rough Road | 45 | 90 | 3 |
| Single-Sided Large Bump | 100 | 100 | 1 |
| Single-Sided Small Bump | 90 | 80 | 0.89 |
| Double-Sided Large Bump | 70 | 100 | 1.42 |
| Double-Sided Small Bump | 80 | 90 | 1.12 |
| Driveway Entrance | 100 | 70 | 0.7 |

CONTEXT AWARE ACTIVE SUSPENSION CONTROL SYSTEM

CROSS-REFERENCE TO RELATED APPLICATIONS

This application is a continuation of International Application PCT/US2014/029654, entitled "ACTIVE VEHICLE SUSPENSION IMPROVEMENTS", filed Mar. 14, 2014, which claims the benefit under 35 U.S.C. §119(e) of U.S. provisional application Ser. No. 61/913,644, entitled "WIDE BAND HYDRAULIC RIPPLE NOISE BUFFER", filed Dec. 9, 2013, U.S. provisional application Ser. No. 61/865,970, entitled "MULTI-PATH FLUID DIVERTER VALVE", filed Aug. 14, 2013, U.S. provisional application Ser. No. 61/815,251, entitled "ACTIVE SUSPENSION", filed Apr. 23, 2013, and U.S. provisional application Ser. No. 61/789,600, entitled "ACTIVE SUSPENSION", filed Mar. 15, 2013, the disclosures of which are incorporated by reference in their entirety. This application also claims the benefit under 35 U.S.C. §119(e) of U.S. provisional application Ser. No. 61/930,452, entitled "ELECTROHYDRAULIC SYSTEMS", filed Jan. 22, 2014, the disclosure of which is incorporated by reference in its entirety.

BACKGROUND

1. Field

Disclosed embodiments are related to active suspension systems and the control algorithms thereof.

2. Discussion of Related Art

An active suspension system is a key enabler for the modern passenger vehicle to set it apart from other vehicles. Energy consumption of these systems is becoming a more difficult hurdle to overcome. As the world strives to be more environmentally friendly, consumers are becoming more and more conscious of energy consumption, and vehicles are becoming increasingly efficient in several aspects of their operation, from shutting down the engine at stop lights, to regenerating braking energy, to using hybrid engine approaches, to better aerodynamics.

One of the last frontiers in this domain is suspension systems, where the drive for more performance has often led to higher energy consumption. The present invention fits in that domain by providing a more energy-efficient approach to an active suspension system.

Many automakers have tried to produce a true high-bandwidth active system and failed due to several key shortcomings of existing approaches. One of the most important shortcomings of these systems is their generally unacceptably high power consumption. One of the key functions of any suspension system, be it for a vehicle, machine, platform, or other device, is to isolate the motion of the device or vehicle from its environment (in the case of the vehicle, the road). When the vehicle drives over rough road, or the base of the platform moves, energy is imparted into the suspension through the relative motion of the two components with respect to each other. If not dissipated, this energy may create unwanted motion in the device. Removing energy from a driving vehicle means that the energy efficiency of the vehicle decreases (since all energy in this case is coming from the vehicle itself). The less energy dissipated in the suspension, the more efficient the vehicle can be. At the same time, the comfort to the occupants and stability of the vehicle are also important factors influenced by the suspension system. This poses a dilemma in active suspension systems, since high power consumption in an active suspension drastically increases the integration challenge.

For this reason, active and semi-active suspension system designers are conscious of power consumption, and the control algorithms used in such systems are often conceived seeking to minimize power consumption and yet provide desirable performance. Existing systems deal with this in many different ways. Most systems are designed with power efficiency in mind, in order to provide the same performance at the lowest possible power output. Some systems have control algorithms designed to limit total power consumption, or that balance regeneration (where existing) with consumption. Parameters in the algorithm are also sometimes adapted to the road conditions in order to provide the best performance. A need exists for improved systems.

SUMMARY

Provided herein are methods and systems for reducing energy consumption in an active suspension system. The methods and systems may include determining a set of detectable wheel events and vehicle events that cause movement of the vehicle greater than an operator perception threshold; adjusting operation of the vehicle suspension system so that suspension actions taken in response to at least one of wheel events and vehicle events that are not in the set consume power below a first power consumption threshold; and adjusting operation of the vehicle suspension system so that suspension actions taken in response to an event in the set of events consume power sufficient to maintain vehicle movement below the operator perception threshold.

One novel concept disclosed herein is to consciously and constantly weigh the benefit of an active suspension intervention, and its cost in terms of power consumption, and to intervene continuously in the way to balance those two effects. This approach reduces the requirements for the active suspension.

The present invention describes methods and systems, including a control protocol, for reducing energy consumption in an active vehicle suspension system comprising an event detector scheme coupled with a cost/benefit analysis of each event. This cost/benefit analysis may comprise of any of a number of methods, with power consumption only being one such method.

According to one aspect, the concept relies on detection and classification of discrete wheel events or body events (either as they occur or in a predictive fashion), a method for calculating the expected cost and benefit for each event, and an algorithm for acting on the expected cost and benefit to provide the highest performance at the lowest cost. Once a detectable event is located by the algorithm, a calculation is made to determine the amount of active control performance to apply.

Reference to an "algorithm" throughout this disclosure should be understood to encompass collectively, except where context indicates otherwise, various computer-based components, methods, and systems, and related data structures, for taking a defined set of inputs and executing a protocol involving calculation, transformation, iteration, and the like, to achieve a defined type of outputs.

Events are detected and classified as early as possible, using advanced information, statistical information, or sensor information, and then the expected benefit to the occupants in terms of any of a number of known analysis methodologies that may be further described. The expected cost of the intervention is calculated in terms of its power consumption, or in terms of its energy consumption if the event has a finite duration. This cost function may comprise of other parameters such as gain factors, force commands, averages of these parameters, or any other control parameter that may have an energy implication on the system. The term "sensor" should be understood, except where context indicates otherwise, to encompass analog and digital sensors, as well as other data collection devices and systems that are capable of detecting events and other potential inputs, including accelerometers, motion sensors, Hall Effect sensors, forward-looking cameras, navigation and GPS systems and many others that provide information to assist in the control protocols described herein, including, without limitation, advance information about road conditions, and the like.

According to one aspect, in response to the event detector, the algorithm adjusts the actions of the active suspension in a way such that the energy or power consumed over the upcoming detected event is kept as low as possible while the performance meets the desired levels. This may be done using a continuous scale, or it may be done using discrete thresholds on the benefit, the cost, and the settings. These thresholds may also be limited to simple trigger thresholds. Event detection may be a discrete event or a continuous analysis of terrain. For example, in the latter case a smooth road may be detected, and the system may reduce active control output (gain factors, thresholds, etc.) when there is a high cost (in terms of energy, etc.) compared to a small benefit it is creating (vertical acceleration mitigation, other ride metric, etc.), in response to the smooth road.

The suspension system's operation may be adjusted to consume power below a threshold for power consumption, and the interventions may be sized such that vehicle body movement is kept below a threshold.

The vehicle body may be a passenger vehicle, such as a car, SUV, or light truck, as well as a heavy industrial or vocational truck. It may also be a superstructure suspended by a suspension from a moving substructure, such as for example a truck cab suspended from the truck frame, a truck bed suspended from the frame, a medical procedure table suspended from an ambulance or vessel, or a seat suspended from a truck, passenger vehicle, bus, or ship, just to name a few. The vehicle body may also be a suspended platform for instrumentation, weapons, or video camera equipment where the suspension system is disposed between the platform and the substructure creating the disturbance.

The approach is predicated on the fact that in general, less motion of the vehicle or other device is associated with more power expenditure in an active suspension system, and that benefit of an active suspension vehicle is in general heavily nonlinear; therefore, a way of reducing average power consumption is to apply more active control to the body only when this control provides a significant benefit, and operating in energy-efficient, but somewhat less comfortable, modes the rest of the time. To enable this, one may identify the scenarios, events, or interventions in which greater benefit is provided, such as comfort to the consumer in the case of vehicles and more critical stability in the case of other devices (e.g., a medical platform). Methods and systems disclosed herein generally relate to changing active suspension control algorithms in relation to a cost function that has at least one parameter related to energy consumption (average power, instantaneous power, control function gains, force output, etc.).

The road events for the purposes of this invention may encompass a variety of meanings. In a preferred embodiment, wheel events seen by a vehicle's suspension are classified into a set of detectable characteristic events. In this context, wheel events may be defined as inputs into the wheel from the road, including wheel motion at body frequency (in some embodiments approximately 0-5 Hz), causing body motion also, and wheel motion at wheel frequency or higher (in some embodiments approximately 5-25 Hz). Wheel motion at body frequency is sometimes referred to as vehicle body events, which may be considered a subclass of wheel events. In some cases the term "wheel event" is used to refer to a specific wheel event that may occur roughly at a wheel frequency.

These detectable events may occur on typical average roads, which may be classified according to their roughness, the frequency or number of turns, the speed on which they are typically driven, or specific recognizable input shapes such as speed bumps, driveway entrances, road transitions, and manhole covers. Road events may include particular shapes of road that cause discomfort or high power consumption. They may also include specific roads, such as racetracks, which may be either recognized by the event detector scheme, as described further on, or even recognized by the driver and communicated to the algorithm through a user interface.

Another way to classify roads or events is by how often they are likely to occur. For example, the driveway leading to one's home is an important event in many ways, because it is a regular, known disturbance and carries an expectation of comfort by the operator of the vehicle. This event may thus be classified through recognition of its recurrence, and qualified as being of high importance for the same reason. Roads may also more generally be classified through analysis of the history of the suspension system, and grouped into similar road profiles using a statistical approach, or they may be grouped according to known road profiles ahead of the car gathered from look-ahead sensors or from stored or cloud based information like road profile maps using GPS.

Special cases of road events are emergency situations, where special rules may apply since the benefit calculation in these cases dramatically exceeds any power considerations. As an example, when the event detector recognizes an emergency maneuver through large lateral acceleration or longitudinal acceleration, it might increase the road holding ability and decrease the comfort in the suspension. In another embodiment, the vehicle may be able to use one or more sensors to detect an imminent crash by analyzing driver inputs (e.g. braking), radar, sonar, vision, and other sensors. When an imminent crash event is detected, a signal may be sent to the active suspension system to prepare it for an evasive or braking maneuver. In such a scenario, one or more of a plurality of settings may be instantiated: stiffen up the suspension to reduce roll and dive, increase power limits to use all necessary energy to keep wheel in uniform contact with the road to reduce wheel bounce, and/or stabilize the vehicle to reduce oscillations. In the event of an imminent rear-end collision (where the active suspension vehicle is about to collide with the rear end of another vehicle), the active suspension may instantaneously adjust ride height (e.g. increase ride height) in order to ensure the bumper collides with the vehicle in front. This may similarly be done with the rear of the active suspension vehicle to limit damage if another vehicle hits the active suspension vehicle rear end. In some embodiments, the adaptive cruise control, collision detection, or parking assistance sensors may be used to detect this imminent collision, and in some cases it may be able to indicate whether the ride height should be increased or decreased.

In another embodiment targeted towards safety but also comfort, the active suspension may adjust the pitch of the vehicle during brake roll-off based on the depression angle or amount the driver has set the brakes at.

One aspect of the methods and systems disclosed herein is defining ways to recognize a given event as early as possible, and classify it according to the definitions given previously. This is done through the use of a plurality of sensors, on or off the vehicle, and various kinds of analysis to process the sensor data. The classification and characterization of events is important. When transitioning between an energy efficient mode and an active mode, the determination of the expected perceived benefit should be made as early as possible to avoid uncomfortable transitions.

In one embodiment, the event detection algorithm compares the severity of an event, defined in terms of its impact on occupant benefit, to a threshold. If that threshold is exceeded, then an intervention of the active suspension system is warranted; otherwise, the suspension system may concentrate on energy-efficient operation to conserve fuel or electricity (for example, in an electric car). If the event is not expected to produce motion in the vehicle body that exceeds a lower perception threshold for the occupants, then no action should be taken to mitigate it.

While the notion of perception thresholds is discussed, it is possible that some allowed disturbances may still create a perceptive effect, albeit substantially lower than if the event was not mitigated using the active suspension system.

Another embodiment of the invention comprises a different approach to the same problem. In this embodiment, the event detector is replaced by an algorithm classifying the current driving scenario and continuously calculating the projected cost/benefit ratio for each potential future intervention.

A statistical analysis might allow predicting future events. For example, when driving on a smooth road, slowing down, and turning sharply, there is a high likelihood of a road transition coming up. These road transitions include driveways or road junctures that often cause large motions to the vehicle body, and which often are a significant factor in the perception of a smooth riding vehicle. The algorithm reacts to the pre-conditions of such an event (in this case, decreasing speed with a certain pattern, overall smooth road approaching, and high steering angle) by increasing its intervention, for example by increasing the control gains of the active suspension system.

Another pre-condition that may be detected might be specific driver inputs. If a driver is driving erratically, and thus imparting a pattern of steering, brake, accelerator, or gear shift inputs that may be correlated with poor visibility, bad road conditions, or impaired driving conditions, then the safety of the vehicle should be prioritized at any expense in the power consumption, thus setting a different performance factor than without these pre-conditions. If on the other hand the driver input is easy, but tenses up suddenly, then a bad road segment might be expected.

Another pre-condition might be derived from purely statistical analysis of existing roads. It is most likely to see large potholes on roads that are driven in a certain speed range, and with a certain steering input. For example, the driver may reduce speed and swerve repeatedly if the road exhibits large holes. In this case, the performance of the active suspension system is more important and should be prioritized. In addition, road conditions may be at least partially predicted based on a sensed driver input.

Another pre-condition might be based on a history of the wheel motion in the past period of time driven. If the road has been bad for the last few seconds, it is likely to at the very least remain that way, and thus performance of the active suspension might be adapted to slowly increase if the benefit has been underestimated over the past period of time. In one embodiment, this scheme may be improved through analysis of all of the past events seen by the suspension. The algorithm may look for time periods in the past history of the motion of the vehicle where the occupant comfort levels are poor, and find characteristics in the input profile leading up to these time periods that are repeatable. As an example, an analysis of wheel motion as measured by accelerometers on the wheel may detect elevated levels of peak wheel acceleration on roads with cracked or damaged road surface. These roads are likely to excite the vehicle body even if they have not already done so, and an analysis of past history of driving may lead to defining a continuous or discrete scale relating road roughness to the likelihood of poor occupant comfort, taking into account the past actions of the active suspension system during these times. This continuous or discrete scale may then be used, possibly in conjunction with other sensors, to recognize this event.

Another way of characterizing events is based on road mapping information. This may come from cloud-based or stored information such as maps and road profiles, in conjunction with GPS position mapping. It may also come from GPS-based recorded information. For example, the control algorithm may store every event where the level of discomfort exceeds a certain threshold, and the corresponding GPS location is measured. This may then allow preparing for possible large events by detecting an approaching stored "bad event" position. The GPS location may also be used in a more sophisticated way by using the mapped road information, along with vehicle speed, driver inputs, and other factors such as for example navigation system commands to pre-determine turns, lane changes, and road transitions, and thus predisposing the control system for those situations. Mapped information may include topographical map information, which may be an input to ride comfort, overall vehicle efficiency, and the like.

Another way to characterize events ahead of the vehicle may be to use look-ahead information from vision-based systems, radar, sonar, lidar, laser or other measurement systems that in conjunction with processing algorithms may detect road profiles ahead. In this case, the algorithm may detect large road bumps, potholes, and other road unevenness and predict the impact on occupant comfort; it may also detect impending driver inputs or even impacts, as many systems already do, and allow the suspension algorithm to switch to a high active mode for safety or for comfort reasons.

The benefit to the occupant or system may be defined in many ways. In general, it may represent a measure of the quality of the isolation the active suspension is providing. For human occupants, this measure is determined through a relationship between measured quantities and subjective measures of comfort. In general, it may be based on human interface models developed by the automotive, aerospace, and transportation industries to determine what motions at what frequencies most affect humans. In some implementations, it may be a simple sensor measurement such as an accelerometer reading.

For non-human target systems such as instrumentation or weapons systems the benefits may be more directly based on measurable quantities, though still typically through a relationship between those quantities and the motion parameters the instrumentation or weapon is sensitive to.

The expected benefit may be continuously calculated in some embodiments, but in other embodiments may also be calculated only when events are detected, or in yet other embodiments may be calculated in discrete time or space increments for entire sections of road.

The human perception of comfort in a passenger vehicle is typically not linear with regards to motion of the vehicle. First of all, it depends heavily on the frequency of the motion, which may be more or less emphasized in an active suspension control system. Second, it depends on the direction of motion. For example, roll motions of the vehicle are perceived differently, and with different critical frequencies, than pitch or heave motions. The inventors have discovered that roll motions are particularly critical at the frequencies where the neck has to do a lot of work to hold up the head (normally around 3 Hz), while heave motions are particularly critical at the resonant frequencies of the inner organs inside the human body (normally between 4 and 8 Hz). In some embodiments roll motion compensation is biased towards higher performance around 3 Hz, whereas vertical heave motion compensation is biased towards higher performance between 4 and 8 Hz.

In other embodiments, the benefit might be defined as allowing instrumentation to work, which may depend heavily on the suspended natural frequencies of components of the instrumentation.

In yet another embodiment, the benefit might be the ability of a surgeon to do his or her work while the superstructure is in motion, which might be particularly difficult if the medical procedure table moves at intermediate frequencies where the surgeon may have to control their hand motions in response, while they may be much less sensitive to low frequency motions or high frequency motions.

A simple implementation of a benefit calculation represents defining a lower threshold for what the human or non-human occupant of the target system is sensitive to. For example, a measure of vertical acceleration at the occupant's seat in a passenger vehicle crosses a threshold, at a given frequency, if the occupant can sense the motion, or more precisely, if the occupant feels disturbed by the motion. Based on this, the perception threshold may be calculated for any given input, based on its frequency content and time history. In many embodiments the perception threshold is a measure of occupant discomfort, not merely an indicator on whether the disturbance may be felt.

In one embodiment, such an analysis may include a root mean squared acceleration, weighted according to human perception factors at each frequency. The perception factors may for example be industry-wide accepted "ride meter" values as used by vehicle manufacturers to quantify a vehicle's comfort performance, or they may rely on the well-known NASA studies for human body vibration sensitivity. Another embodiment may include determining the frequency of the input, and characterizing the event by the input frequency alone.

In a preferred embodiment, the expected benefit for the occupant is calculated ahead of time, and for a multitude of interventions from the active suspension system. In order to do this, we may use information from the available sensors on the vehicle and ahead of the vehicle, as described previously, to predict the upcoming inputs. This information is then fed into a model of the vehicle and suspension.

In a simple embodiment, this model may represent a quarter car model with a sprung and unsprung mass, the suspension and tire springs, dampers, and actuators as needed. In more complicated embodiments, this model may represent a full vehicle, which may include only rigid body degrees of freedom or also include flexibility of the vehicle body, and may include suspension dynamics and kinematics as required to achieve the desired model accuracy. The model may also, in other embodiments, be continuously adapted and improved based on measured outputs, in a predictor-corrector type scheme, like for example a Kalman filter.

The output of this model may then be used to determine the expected benefit to the occupants. In a simple embodiment, the output may be calculated for the vehicle in each of a multitude of control modes, and the expected benefit and cost may be calculated for each, based on the model. This may provide sufficient information to preemptively modify suspension behavior to maximize performance and minimize power consumption.

The cost for the purposes of this calculation may be defined as the amount of power consumed by the active suspension system. Depending on the type of input event, the cost may mean one of a multitude of things. For events that are characterized by short or in general finite duration, or may be predicted in their entirety, it makes more sense to calculate the total amount of energy for the event, while for events that are indeterminate in duration it makes more sense to talk about the average or instantaneous power. The goal is for the system to reduce overall energy consumption.

Once a classified event is recognized, and a calculation of the expected benefit and cost is made, then a scheme may be applied to determine the course of action to take in the active suspension system. A general way of defining the action taken is to define a performance parameter that scales the level of active suspension intervention.

In a simple embodiment, we may simply set a lower threshold on the benefit. The threshold on the benefit may for example be related to a frequency-weighted perception threshold to the human occupant. If the event is expected to cause discomfort greater than the threshold, and an intervention is thus warranted, then steps are taken to operate in a less fuel-efficient, but more comfortable, mode. As soon as the motion of the vehicle in the more fuel-efficient mode is projected to fall below the mentioned lower threshold for discomfort, the intervention may be discontinued and fuel-efficient operation may resume. A lower threshold on benefit allows the control system to ignore small interventions and focus on only the significant ones. An upper threshold on power allows to not skew the average power disproportionately through a single event.

In a more general embodiment, one may consider a ratio between the benefit and the cost, while still maintaining lower and upper thresholds on each. In general, a parameter related to the ratio of benefit to cost may determine the amount of active intervention required for each event.

The algorithm in one embodiment continuously adjusts its expected benefit/cost ratio for the present or upcoming road events, and sets the performance parameter accordingly. For events or interventions where a high benefit/cost ratio is expected, the performance parameter is set high and the active suspension algorithm creates high performance along with typically higher power outputs. For events where the benefit/cost ratio is expected to be low, the performance parameter may be low and the active suspension algorithm may maintain a low-energy, low performance status, thus saving overall average energy. For events where the benefit/cost ratio is between high and low, the performance factor may also be lower than the maximum but higher than the lowest value, and the active suspension system may go into an intermediate mode where comfort is prioritized, but not as much as in high performance mode.

The benefit/cost ratio may be continuously calculated, or may be limited to a simple threshold or multiple sets of thresholds. These thresholds may also adapt over time as a function of the comparison between expected benefit and cost to actual benefit and cost over each road event.

The range between high performance and high efficiency operation in the suspension system may be a continuous scale, may have a nonlinear mapping where certain regions are more emphasized than others, or the algorithm may change in discrete steps including at least two operating points.

In one embodiment, the algorithm operates on a purely reactive basis by reading the sensors on the vehicle, including any of acceleration sensors on the vehicle body, rate sensors on the vehicle body, position sensors between the sprung and unsprung mass, sensors correlated with the position or velocity of the unsprung mass with respect to the sprung mass, accelerometers on the unsprung mass, or look-ahead sensors as described above. The algorithm may then instantaneously determine the benefit and the cost of the active suspension intervention in course, and may adapt its output to either increase or decrease performance of the system. For example, the algorithm in this mode may target maintaining a minimum benefit/cost ratio, so that when the expected benefit is low or below a first threshold, the cost is kept at a maximum or a low cost threshold. If an event occurs and the benefit/cost ratio decreases because the benefit decreases, the performance is raised until the cost increases too and the ratio is again kept at a minimum level.

In some embodiments, the system is implemented with an average filter on the cost to avoid increasing performance after the event is already over. It may also comprise non-linear schemes such as a fast-attack, slow-decay limit that allows the performance factor to rise quickly but drop slowly after each event.

In a different embodiment, such an analysis may include creating perception thresholds at various levels in terms of measured quantities such as for example vertical or lateral acceleration at the occupant's head, and using the crossing of a given threshold as the quantitative value for ride benefit. In this case, events below a certain threshold of perception may be ignored.

In another embodiment, the analysis may include characterizing each event ahead of time at different control settings, and determining the importance to the driver of each change.

In one exemplary embodiment, we classify events into single-sided and double-sided events, and by their size and the vehicle speed. Large single-sided bumps are important to the perception of smoothness during operation of a passenger vehicle. Such bumps may be recognized at the onset if they follow a certain pattern in road slope, often coupled with low speeds and high steering angles. In this example, the vehicle is driving on a smooth road, in the most energy-efficient mode. A single-sided bump is encountered and detected, or maybe is detected ahead of time by a look-ahead system. The active suspension is switched into the most high performance mode, and held there during the duration of the event. Once the event is over, or once it is determined that the event was misdiagnosed, the suspension system is again transitioned gently back into the most fuel-efficient mode. The overall power consumption in this driving mode may be very low, while the perception to the occupant may be that of a high performance system.

One aspect of the invention is a method of reducing the power consumed in an active suspension system by reducing the amount of roll control the suspension does. There are multiple ways of doing this.

First of all, the benefits of roll control must be evaluated. When a vehicle goes into a turn, the lateral acceleration, which from a rigid body point of view may be thought of as acting at the center of gravity of the vehicle body, may impart a lateral force on the vehicle body (the centrifugal force).

Any suspension system with one or more degrees of kinematic freedom may be linearized at any given operating point along its kinematic path (at any given ride height) to reduce the instantaneous path constraints imposed by the kinematics to a single link with rotary joints at each end, called a swing arm. This swing arm is a simplified representation of the complex suspension articulation path at that operating point, and allows one to find the instantaneous center around which the vehicle as a whole is allowed to roll in absence of suspension forces from the suspension actuators, including springs (airsprings and coil springs and torsion springs), dampers (linear, nonlinear, and variable dampers) and active elements (actuators of all sorts).

This lateral force at the vehicle center of gravity may impart a roll moment on the vehicle body that is counter-balanced by the suspension actuator forces. In absence of active systems, and in a steady-state scenario, the vehicle may roll until the spring force is sufficient to counterbalance the roll moment imparted by the centrifugal force.

An active suspension may act to lower this roll angle. In general, the inventors have discovered that drivers perceive roll rate much more than roll angle.

Some existing suspension systems mitigate final roll angle. Such systems often do so in a nonlinear way as a function of the input level only, and not as a function of time, such that for example the ratio of roll angle change over lateral acceleration change at higher lateral accelerations is higher than the same ratio at lower lateral accelerations.

The present invention relates to a method for reducing energy consumption in an active suspension system while still providing the benefit the consumer is looking for. The inventors have discovered that a major benefit of an active suspension when it comes to roll control is the fact that the vehicle does not roll at the beginning of a turn, and thus is more stable in emergency maneuvers and responds quickly to sharp steering inputs.

On the other hand, the energy consumption of an active suspension is heavily driven by its need for controlling the static roll angle of the vehicle. Some turns, even in normal operation of a passenger vehicle, may be upwards of 10 seconds long, such as for example highway exit ramps or hairpin turns on a mountain road. To hold the vehicle upright for this duration consumes a significant fraction of the total energy consumption in the active suspension.

An active suspension control algorithm that may react quickly to fast steering inputs, and then gently bleed off the need for roll control in longer turns, dramatically reduces the energy consumption and yet still delivers performance the customer notices. The present invention describes one such algorithm. The first step is to calculate a desired roll force command as the force that may be required to keep the vehicle level, or at a small angle that is deemed desirable for short periods of time. In a preferred embodiment, this angle may be zero, but in other embodiments it might be non-zero and in general follow a curve such as the one described above and shown in FIG. 18-8. The roll force command to maintain the vehicle at zero roll angle is higher than the desired roll force command in this plot, which follows curve 1 18-806.

The next step is to feed this desired command into a nonlinear algorithm that allows any fast changes in desired command to get through unaltered, much like a high-pass filter. The algorithm also provides for an initial period of time after any change in command where the desired command is followed closely without any reduction in the output force, which is unlike a high-pass filter. If the desired roll force command is above a threshold, it may also be saturated to avoid excessive power output by the active suspension system.

After a specified time, which in one embodiment might be around one second, the actual roll force command starts to bleed off from the desired command at a slow rate, such as to be substantially undetectable by the vehicle's occupants. This may let the vehicle roll gently at a rate that is substantially slower than any typical maneuver, and is scaled such that it minimizes energy, but without allowing the driver to perceive the change.

The actual roll command changes until it reaches a level at which it both keeps energy consumption below a predefined acceptable threshold even for long periods of time, and maintains the roll angle of the vehicle below a threshold deemed acceptable and safe. This level might be set by drawing a curve as a function of lateral acceleration that represents the minimum threshold, or it might be adjusted based on the duration of the input and the energy state of the system, while still remaining above or at a predefined minimum acceptable roll angle and below or at a maximum defined energy level. Such an algorithm may work in combination with tuned mechanical devices such as one or more anti-roll bars for the vehicle.

One aspect of this algorithm is how it deals with transitions from one turn into the opposite turn. In this case, it is desirable that the vehicle right itself fairly quickly so as to not introduce any lag in the roll response of the vehicle, and then after crossing through zero lateral acceleration behave the same way as at the beginning of the first turn. In one embodiment, the vehicle may follow the desired roll force command for a period of time that is long enough to allow for no detectable changes in roll force command during a typical slalom or double lane change maneuver. If the driver input or road conditions, and thus the desired roll force command, change in the period between the time when the actual roll force follows the desired roll force, and the time when the actual roll force reaches a steady-state value as a function of the input, then the actual roll force again follows any changes in the desired roll force, without removing the already bled roll force command. This allows the vehicle to avoid rapidly changing roll angle as a result of rapid changes in input.

In one embodiment, this algorithm may be modified in such a way that the desired roll force command does not maintain the vehicle flat, but instead allows a certain roll angle that is yet smaller than the final roll angle after bleeding off the actual roll force command. This may also be done adaptively, or in response to a vehicle power state in order to reduce the overall consumption if the vehicle is being driven aggressively for long periods of time.

The methods described here are particularly well suited for active suspension systems using electro-hydraulic, electromagnetic, and hydraulic actuators, where holding force is expensive in terms of power consumption and thus allowing the vehicle to bleed off roll force after some time is a key enabler for low-energy solutions. Such algorithms may be combined with linear motor actuators, hydraulic actuators using electronically controlled valves, hydraulic actuators using controlled pumps and motors, and hydraulic actuators containing a spring in series with the actuator and a damper in parallel with both the actuator and spring. In one embodiment the above algorithms are combined with a hydraulic actuator that comprises of a multi-tube damper body that communicates fluid with a hydraulic pump, which is coupled in lockstep with an electric motor.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2 shows a table of example values for cost and benefit calculations, and an example performance factor that governs control force application in response to the events.

DETAILED DESCRIPTION

Figure 1:
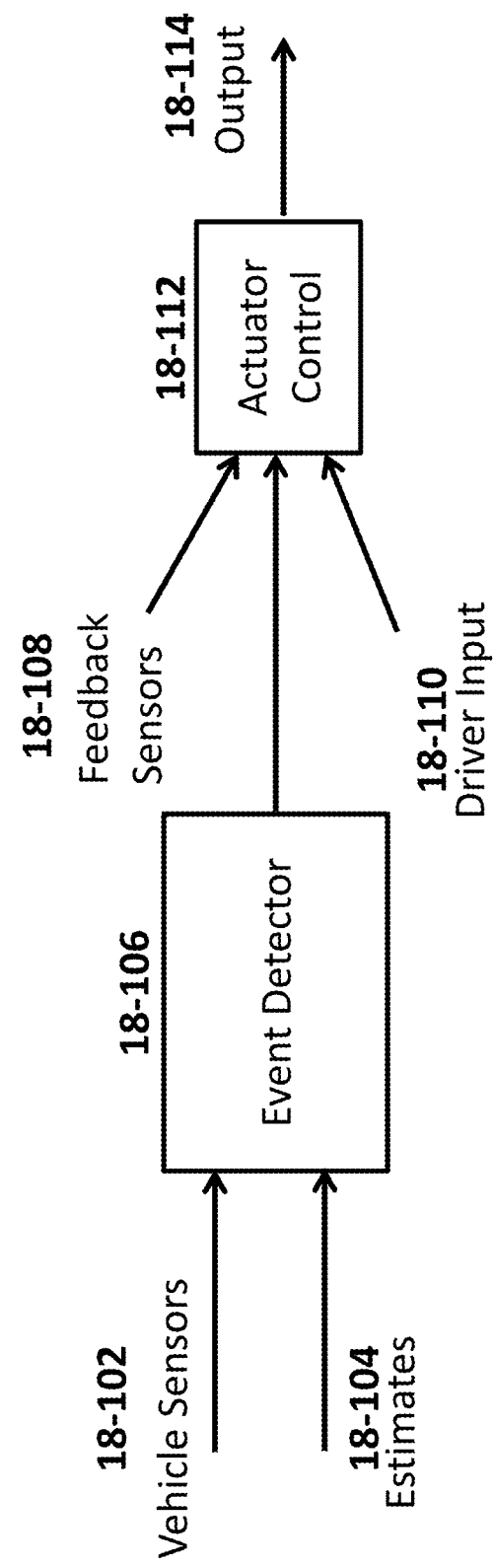
FIG. 1 shows the general logic for an event detecting control scheme, where sensors and estimates generate events that change the behavior of the energy management control system.

An important drawback of traditional active suspension systems is the fact that they often have very high energy consumption. Many of these systems use control algorithms similar to those used in semi-active suspensions, which in a fully-active system consume large amounts of energy.

In order to achieve the goals set above, the system must fight compliances and loss mechanisms inherent in the vehicle, such as friction, suspension spring stiffness and roll bar stiffness, hydraulic losses, and damping in the various rubber elements (e.g., bushings), for a high percentage of its operating cycle. This leads to a large consumption of power in even the most efficient active systems. By focusing on the more important performance goals only, or by watering down performance in general, existing systems may be made more efficient, though oftentimes at the cost of significant reduction in the benefits the system brings to the end consumer.

A better approach to solve this dilemma is "situational" active control, whereby the amount of active control used is dictated directly by the situation at hand. These methods are distinct from the traditional control strategies used with past semi-active and active systems.

The sensor set used for this may include any of the many signals available in a modern car, including acceleration sensors and rotational rates of the car body (gyroscopes), position or velocity of the suspension, vehicle speed, steering wheel position, and other sensor information such as look-ahead cameras. Estimated signals may include estimated (current or upcoming) road vertical position, estimated road roughness, position of the vehicle on the road, and other available signals.

The methods and systems disclosed herein relate to reducing energy consumption in an active suspension system. A set of detectable wheel events and vehicle events is defined, where wheel events are defined as inputs into the wheel that cause the wheel or the body to move, especially where they cause the wheel or body to move in a way that exceeds a perception threshold for the occupants of the vehicle, or that exceeds the thresholds defined for an instrumentation platform, weapons system, video camera platform, medical operation table, or other device that represents the target system.

The operation of the active suspension system is then adjusted such that the interventions of the system in response to events not defined consume substantially less power, but that the interventions of the active suspension system to events that are in the set defined require more power, but provide noticeably more benefit to the occupants or target system, to maintain vehicle or platform movement below a perception threshold defined for the system.

In another embodiment, methods and systems are disclosed for reducing energy consumption in an active suspension system, where a set of detectable events is defined in a way that they produce movement greater than a perception threshold specified for the occupants or the target system. The active suspension system reacts to the detected events in the set of events described above by increasing power demand to a level that is sufficient to maintain motion of the suspended body below a perception threshold defined for the vehicle's occupants or the target system.

In one embodiment, the suspended body may be a passenger or transport vehicle, and the active suspension system is disposed between the vehicle body and at least one of the wheels. In another embodiment, the suspended body is an inertial weapons platform, and the suspension system is disposed between the platform and the platform support structure. In another embodiment, the suspended body is a medical procedure table and the suspension system is disposed to mitigate events generated by movement of the table or a surface that the table contacts. In another embodiment, the suspended body is a video camera stabilization platform, rig, or gimbal and the suspension system is one or more links disposed to mitigate events generated by movement of the platform, rig, or gimbal.

A different aspect of the invention relates to a method for reducing energy consumption in an active suspension system whereby the expected benefit in terms of perception or comfort level associated with each desired intervention of the active suspension system is calculated continuously. At the same time, the cost in terms of energy or power consumption of each desired intervention is also calculated, and the two are weighed against each other to find the optimal level of intervention required to maintain a minimum level of comfort at a small cost in terms of energy consumption.

The intervention is scaled with the expected benefit-to-cost ratio, with a function that may range from a simple threshold to non-linear target thresholds, to a function including minimum or maximum thresholds, to a fully nonlinear continuous function.

In one embodiment, the expected benefit is calculated based on a model of the suspension system and the suspended body, including other physical parameters, allowing for pre-establishment of the expected benefit and cost once an event is detected.

In one embodiment, the expected benefit calculation may use sensor information from any sensor on the vehicle or a wheel in order to detect and classify events. In another embodiment, the benefit calculation uses advanced sensor information from forward-looking sensors, cloud-based road profile information in conjunction with global positioning, information from other vehicles driving the same road, or which have driven the same road in the past, or historical data from previously having driven the same road in the same vehicle.

In another embodiment, the benefit calculation is done using statistical analysis of the road and previous events to predict future events and the result of desired interventions. For example, the system may record the result of interventions at a given performance parameter value on a given event type, and thus improve its performance every time the vehicle encounters an event of that type.

Another aspect of the invention relates to a method for reducing energy consumption in an active suspension vehicle by calculating the desired roll or pitch force command in a maneuver. This desired roll or pitch force command in general may be such that it allows the system to partially or fully compensate for the effects of lateral or longitudinal inertial force acting on the vehicle body as a result of in-plane motion of the vehicle. The desired force command may be calculated based on a model, or based on measured quantities.

The method may calculate the actual roll or pitch force command in such a way that it initially follows the desired roll force command at least partially, and after a first period of time starts slowly decreasing from the initial value. After a second period of time, and if the input remains constant during that time, the actual roll or pitch force command reaches a pre-determined or adapted steady-state value that allows power consumption to be reduced but maintains a vehicle motion response that is deemed acceptable and safe by the occupants. The final energy consumption value may be at or below a threshold for power consumption, or the final vehicle roll angle may be at a limit value deemed acceptable.

If the input changes during the period of time before the first time cutoff threshold, where the actual roll command force at least partially follows the desired roll force command, the active suspension system responds by following all input changes rapidly. If a portion of the input remains constant, and a portion changes after the period of time where the actual command at least partially follows the desired roll force command, then the system responds by quickly following the changes in desired roll force command, but keeps slowly decreasing the component of the roll force command that is due to the unchanged component of the input.

If at any time the input reverses direction, then in one embodiment the system may behave as if the previous inputs had not existed, and as if this was the first turn encountered.

A method to reduce active suspension energy consumption, such as described here, may be particularly effective in conjunction with open loop driver input correction algorithms. These algorithms allow estimating the desired roll force commands based on a model of the system by using measured or estimated driver commands as the inputs. For example, they may use the steering angle and the vehicle speed in combination with brake pedal force, or any sensors suitable to measure or estimate those quantities, to predict the vehicle motion and thus anticipate the inertial forces on the vehicle. This allows for an estimate of the desired roll and pitch force command that is not sensitive to the actual motion of the vehicle, and may be used as a stable reference signal to calculate the actual roll force command as a function of time. This allows for more stable operation of the algorithm described above, which might be more sensitive if it used measured lateral acceleration as its input. It also allows using the estimated lateral acceleration as an input for the desired roll force command in vehicles where no lateral acceleration sensor is present.

Open loop driver input correction may also serve as a great event classification method for driver inputs, for example by categorizing steering and handling events by the calculated lateral acceleration based on the open loop vehicle model, or by other less measurable parameters in the model such as the lateral tire force built up in each axle. The system also allows detecting events due to handling in the absence of a lateral acceleration sensor in the vehicle.

A method for reducing active suspension energy consumption may work well in conjunction with frequency-dependent damping, whereby the frequency at which the roll force commands are applied, which is generally in the body frequency range of up to 6 Hz, is separated from the frequency at which wheel damping events happen, which is generally around 10 Hz. The frequency-dependent damping may serve to maintain a minimum level of energy regeneration in a regenerative active suspension system, and thus may help reduce energy consumption overall. Frequency-dependent damping also helps by improving the detectability of wheel events, and reducing the requirements on the event detector to be able to focus more heavily on wheel events around body frequency. In addition, it may allow suspension control protocols to be distributed about the vehicle across a plurality of controllers such as actuator specific controllers and central vehicle controllers.

The method for reducing active suspension energy consumption may be associated with an active suspension with on-demand energy flow, whereby the energy required to act on an event that was detected is drawn instantaneously from the active suspension system without constant energy consumption between events. This allows maximizing potential of the event detector scheme by allowing it to reduce energy consumption between events to a very low level. With an active suspension with on-demand energy flow, the suspension may be in a very low power or even a regenerative mode during driving times where the disturbance to the occupant is low, and only consume power during times when the disturbance to the occupant may be high without the active suspension system. In an active suspension system with substantial continuous power draw, this benefit may be much less marked. By controlling the energy consumption source in an active suspension to rapidly create a force response, many of the methods, systems, algorithms, and protocols described herein may be enhanced so that the system may throttle energy consumption dynamically.

The methods and systems for reducing active suspension energy consumption may be associated with an active safety method for active suspensions. The active safety method for active suspensions acts on various safety aspects of operating a vehicle, such as for example impending crashes, roll-overs, or vehicle skid situations. When operating in conjunction with a static active suspension algorithm, the active safety system has to fight the normal operation of the active suspension if it tries to move the vehicle, for example to raise the front end or entire vehicle in an impending crash. When operating in conjunction with an event detector scheme, the system may be used in synergy. The event detector may identify and classify safety events, as described in this patent, and communicate those to the active safety algorithms, which may in turn act on them to raise occupant safety. Sensors used in the event detector protocols may be shared with the active safety system. Vice-versa, the active safety system may provide information to the event detector to qualify safety events as events where the benefit calculation is maximized, and the cost is neglected. The event detector scheme may then again act to provide safe driving functionality at all costs, and improve the safety outlook for the occupants.

FIG. 1 shows one possible embodiment of an energy throttling active suspension control scheme, where an event detector 18-106 reacts to inputs from sensors 18-102 and estimates 18-104 to decide if an event requiring high amounts of active control has happened, is in process, or is about to happen.

The sensors may include vehicle motion sensors such as acceleration sensors, velocity sensors, position sensors, and rate gyros, but may also include look-ahead information from vision-based systems, radar, sonar, and other similar technologies. They may include measured quantities related to driver input, such as steering angle or torque, brake apply pressure, and manual transmission status, and measured quantities related to vehicle status, such as actual brake pressure, automatic transmission status, engine parameters such as crankshaft angular velocity, and vehicle or wheel speed. They may include the status of other vehicle systems, such as anti-lock braking, stability control, or traction control, and of vehicle systems such as electronic power steering or air suspension. The sensors also may include measurements representing the electrical states of the system, such as power, current, or voltage measurements. They may also include sensors measuring other physical quantities such as tire pressure, airspring pressure, temperature, road surface texture, and others.

The estimates represent quantities that are estimated based on combination of measured quantities and calculated quantities from models or equations. These may include for example road roughness, road coefficient of friction, vehicle motion state derived from a vehicle model, as well as estimates of power consumption and general vehicle power state. The estimates may also include statistical or projected future parameters, such as expected road profile in cases where we may extrapolate road profiles from past history of the road, expected road roughness or vehicle attitude, expected driver actions based on historical information, and others. These estimates may be calculated internal to the controller where the event detector resides, or via external electronic control units of the vehicle such as the stability control ECU or another state predictor controller.

For the rear wheels, information gathered from the front wheels, such as estimated road position, input harshness, suspension travel history, or other useful signals, may be used to improve the event detection.

The output of the event detector may be in the form of a command when the information is accurate, or in the form of a parameter adjustment (such as a response to rough road or to driver input, where the response may be a change in the control strategy going forward), and may in general be accompanied by a "confidence" factor. This output, along with vehicle feedback sensors 18-108 and measured driver input 18-110 is the input to the actuator control logic 18-112, which determines the required output command.

FIG. 2 shows a possible implementation of an intervention cost-benefit table that may be used to determine the output performance factor for the general active suspension algorithms. The first column lists the event types, which are recognized through an event detector scheme. Event detector schemes are detailed in this disclosure, but may include identification algorithms that process forward-looking data or measured body/wheel data (e.g. accelerometers) in order to determine a characteristic situation the vehicle is in. For example, a rough road might be detected by a high average RMS wheel acceleration, and a driveway entrance may be detected by a detected downslope and immediately following rising slope. While the embodiment of FIG. 2 shows discrete event types, some embodiments may classify using continuous functions such as a road roughness severity factor or traversed obstacle height factor.

The second column lists the calculated intervention benefit for a given event type. This benefit may be calculated ahead of time for a given event type, but may also be calculated instantaneously for a specific upcoming intervention. For example, when driving on a road that has been smooth but is getting rougher, we may estimate that the benefit from increasing the active control is more aligned with a medium-rough road, and may thus decide to increase the performance factor to be used. The benefit can be scaled from 0 to 100%, with 100% being the most beneficial intervention.

The benefit to the consumer may be measured using an algorithm that may be one of many widely accepted performance metrics for human perception of vibration, and it may be modified through the use of specific information about passenger vehicles (where for example roll motion of the vehicle is more widely felt than pitch motion), and through the use of historic information from past events in the vehicle or in similar vehicles.

The third column shows the projected or pre-calculated cost of the intervention. This cost may be in terms of energy expended for the event, or average power if the event is ongoing. While this embodiment demonstrates a predetermined intervention cost, the invention is not limited in this regard. Several embodiments calculate cost as incurred. For example, the control algorithm may attempt to mitigate the rough road event, measure a running average of consumed energy, determine the intervention cost is exceeding a threshold, and due to the low intervention benefit gradually reduce mitigation of the event.

Figure 3:
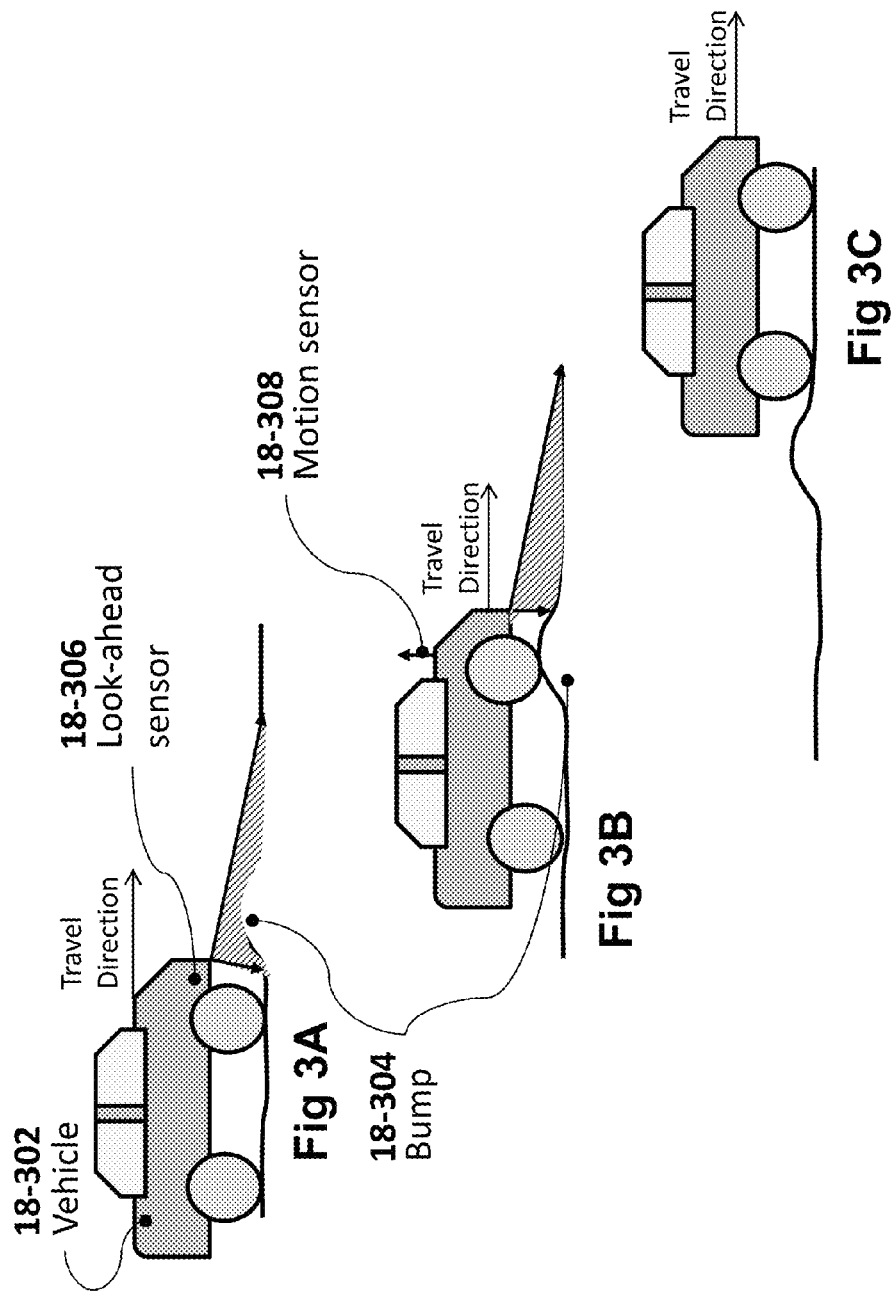
FIGS. 3A-3C show an example of the event detector in operation, where the vehicle hits a bump, detects the event, and switches into high performance mode during the event only.

FIG. 3A-3C show an example of the event detector scheme in operation. The vehicle 18-302 is traveling from left to right in the figure. The road profile is smooth under the vehicle in FIG. 3A, and thus the benefit to the occupants of a high performance active suspension system is low. Thus, in this situation the active suspension system is in a low energy mode.

The event detector may now recognize an event 18-304, possibly ahead of the event if the vehicle uses a look-ahead sensor 18-306, or at the onset of the event as shown in FIG. 3B if the vehicle employs a motion sensor 18-308 (such as an accelerometer or displacement sensor). In response to the event detection, the active suspension switches to a high performance mode, thus maintaining optimal comfort for the occupants.

Once the event is completed, as shown in FIG. 3C, the active suspension system switches back into a low energy mode. Modes such as low energy and high performance are general labels, and the system may be implemented in a continuous fashion where gain factors, thresholds, and other parameters are modified to affect low energy, high performance, and the like.

Figure 4:
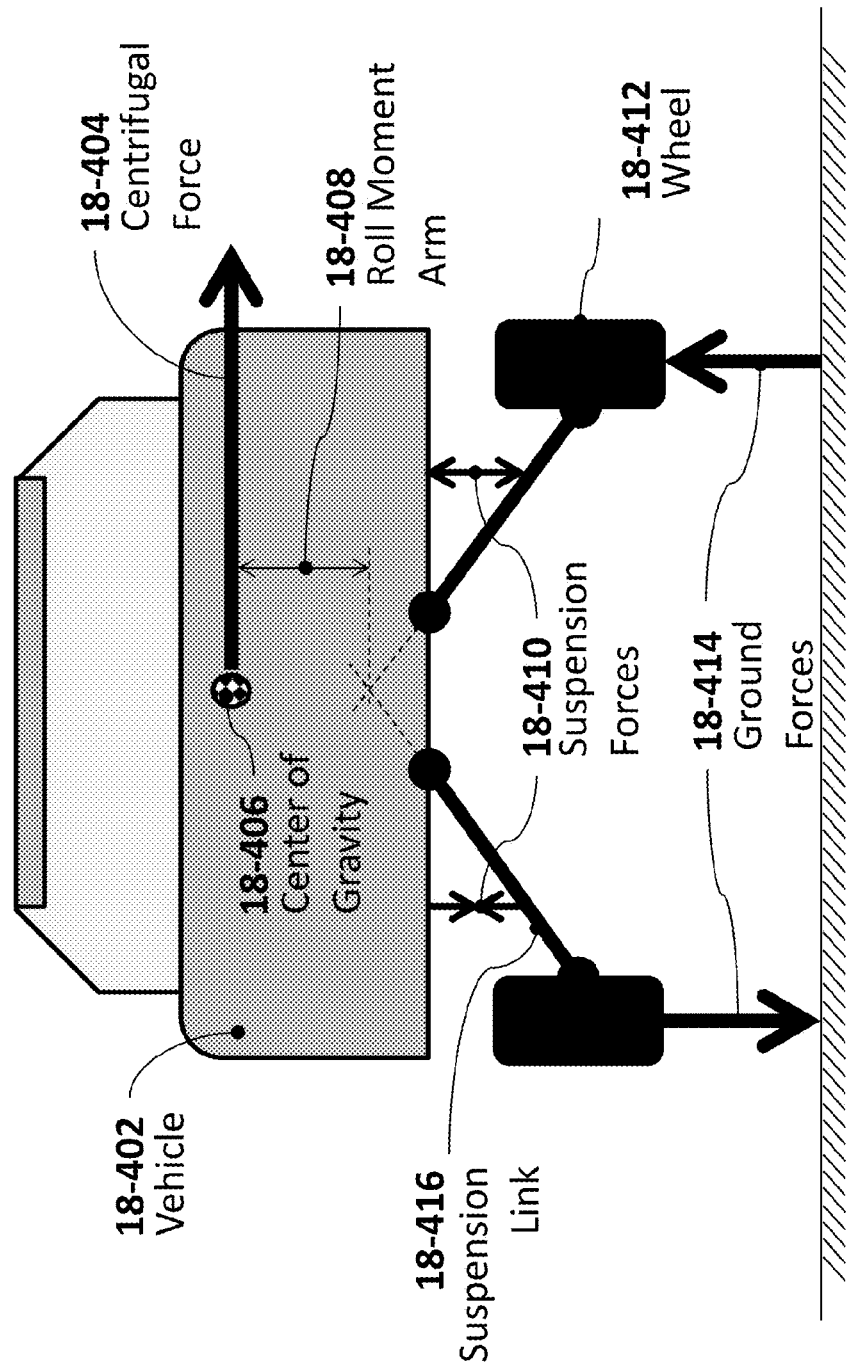
FIG. 4 shows the general layout of a vehicle in a turn, with the forces and moment arms governing the physics of the system.

FIG. 4 shows forces acting on a vehicle in a turn. The vehicle 18-402 is pictured from behind turning left. In a left turn, the centrifugal force on the vehicle 18-404 pulls toward the right side of the vehicle, and may be thought of as acting on the center of gravity of the vehicle 18-406.

The vehicle's suspension as seen from the rear of the vehicle may be thought of as a single link 18-416 connecting each wheel 18-412 to the vehicle body. The link connects the instantaneous center of rotation of the suspension kinematics to the wheel, thus instantaneously representing all the suspension constraint forces (which follow the direction of the link). The intersection of the projections of the two links creates the vehicle's roll center. The distance from the roll center up to the center of gravity is the roll moment arm 18-408, which determines how much the vehicle wants to roll due to the centrifugal force 18-404.

The suspension is held up by suspension forces 18-410, and the two wheels each create a ground force 18-414. Both the suspension and ground forces are shown in the diagram without the static contributions of the vehicle weight.

When the vehicle turns to the left, the roll moment created by the centrifugal force 18-404 around the roll moment arm 18-408 must be counterbalanced by the moment created by the left and right suspension forces.

The suspension forces are composed of spring forces, damper forces and actuator forces, which in this schematic are assumed to be all acting on the same point. In the absence of active forces, a given roll moment may require a fixed roll angle of the vehicle in order to create the necessary spring forces. Damper forces in general may only act on a roll velocity of the vehicle, and are not relevant for steady-state discussions.

Figure 5:
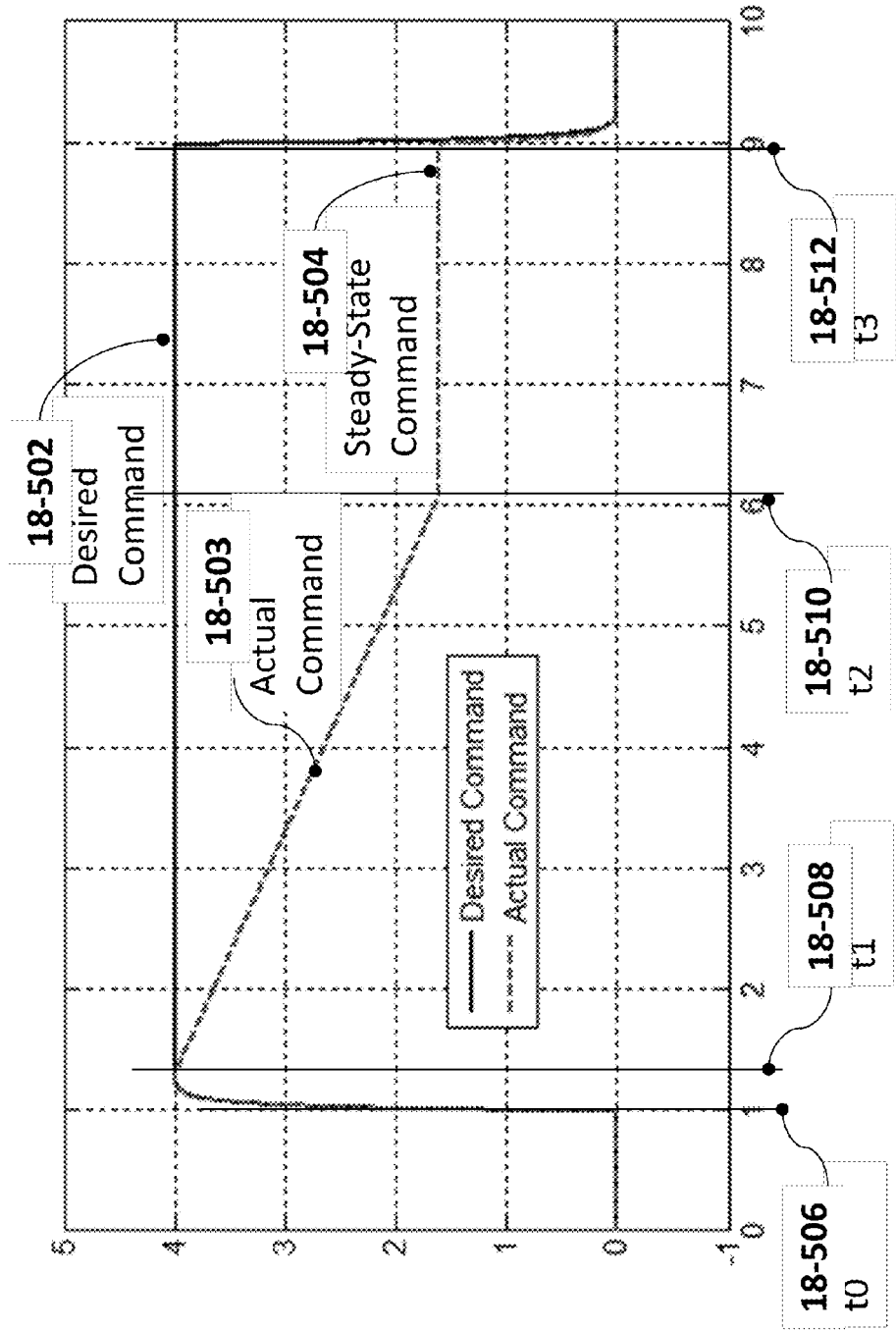
FIG. 5 shows the roll bleed algorithm for a step steer input of long duration.

FIG. 5 shows an example of functionality of the roll bleed algorithm. The desired command 18-502 in this example represents a desired command to during a step steer. This desired command may be based on vehicle stability parameters and might not account for time or energy considerations. The desired command may comprise a flat curve correlating lateral acceleration and roll angle (to ensure the vehicle is always level), or it may allow some roll at a given lateral acceleration. The steering input may be a sudden change of steering angle at time t0 18-506, leading to a desired control force shown by the solid line 18-502 (here represented in units of lateral acceleration, but this may be in terms of actuator or wheel force, or other similar command). The actual roll control command 18-503 follows the desired command up to a time t1 18-508, then slowly decreases until time t2 18-510, at which point it has reached a steady-state command value 18-504. At time t3 18-512 the input is removed and both the desired and actual command go back to 0. The time thresholds may be fixed constants or adaptive based on driving conditions, style, vehicle modes, etc. The reduction of the actual command with respect to the desired command, or the roll bleed, may be set to have a preset slope, a non-linear response, or it may be adaptive based on a number of parameters.

Figure 6:
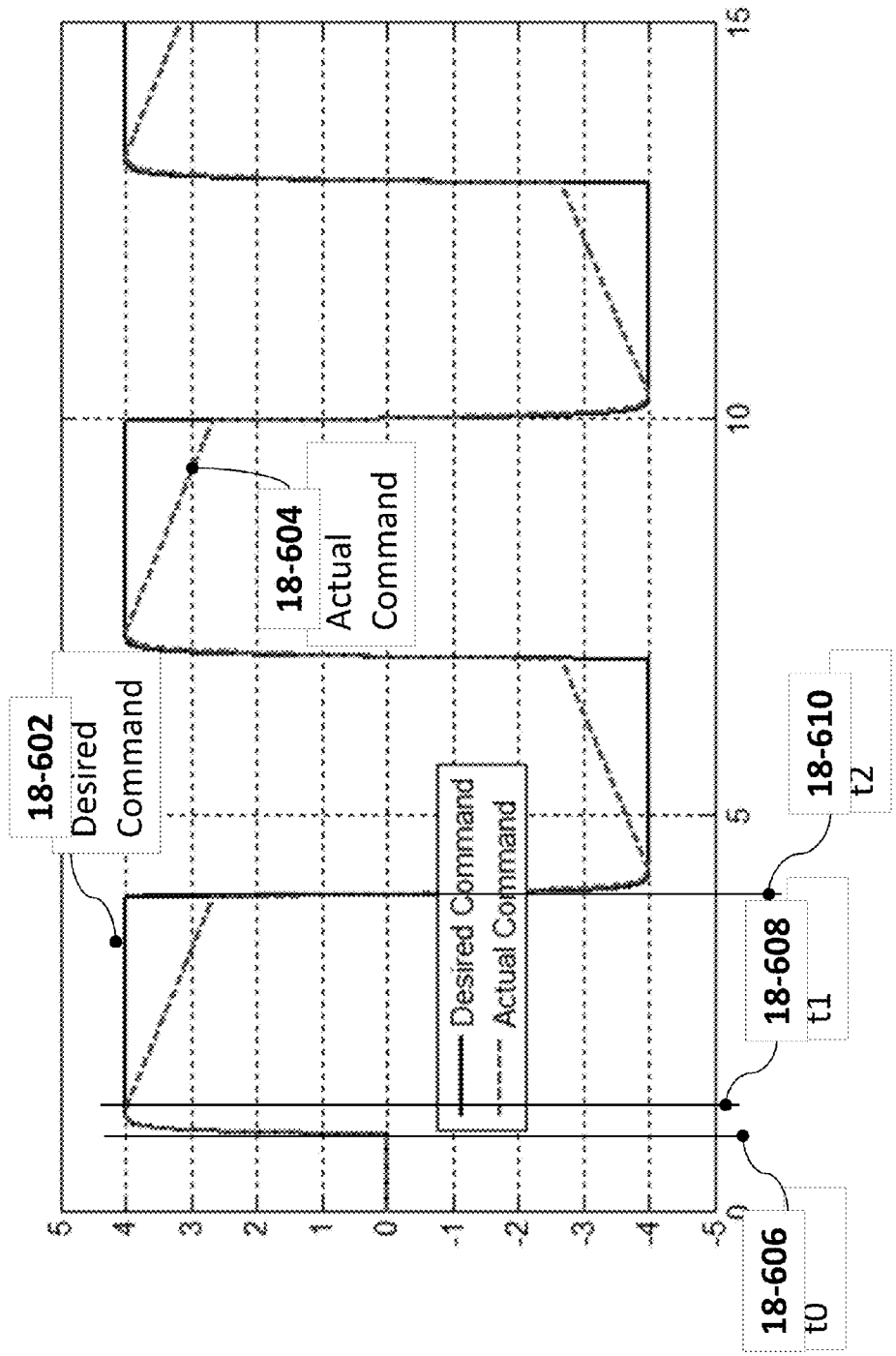
FIG. 6 shows the roll bleed algorithm for a step slalom input of medium duration.

FIG. 6 shows the same roll bleed algorithm for a faster maneuver. This time the input is a step slalom maneuver, where the input steering angle is held constant for three seconds, then changes direction and is again held constant for three seconds. The input changes at time t0 18-606, creating a desired command 18-602 that steps up and holds constant.

The actual command 18-604 again follows the desired command 18-602 until time t1 18-608, and then starts dropping off. This time, the input is removed at time t2 18-610 before the actual roll command has reached its steady-state value, and the actual command simply follows the desired command into the beginning of the next turn, only to then bleed off again as before.

Figure 7:
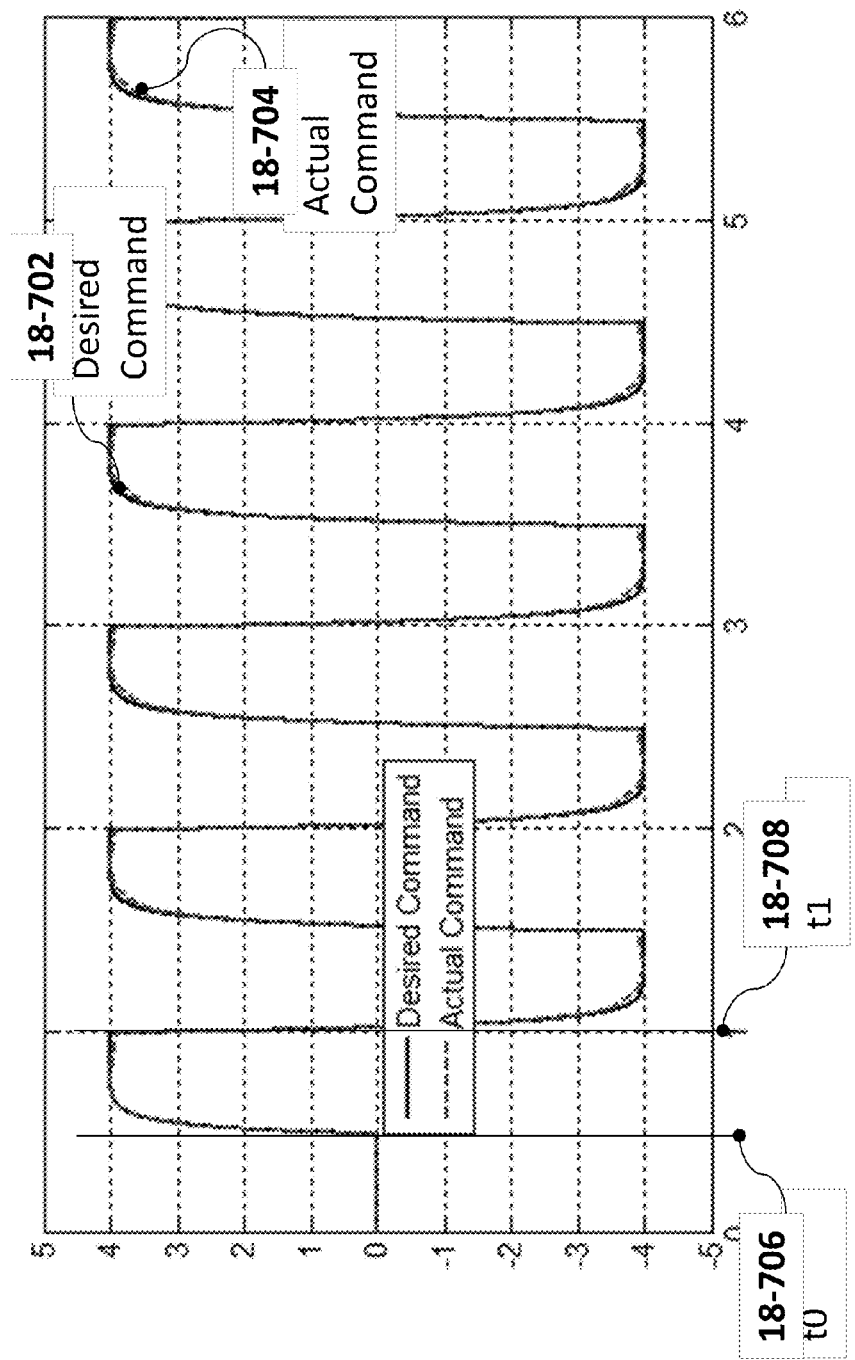
FIG. 7 shows the roll bleed algorithm for a step slalom input of short duration.

FIG. 7 shows the same roll bleed algorithm for an even faster maneuver. This time the input is again a step slalom maneuver, where the input steering angle is held constant for a half second, then reversed. The desired command 18-702 again steps up at time t0 18-706, and then reverses at time t1 18-708. This time though, the actual command follows the desired command through the entire input motion.

Figure 8:
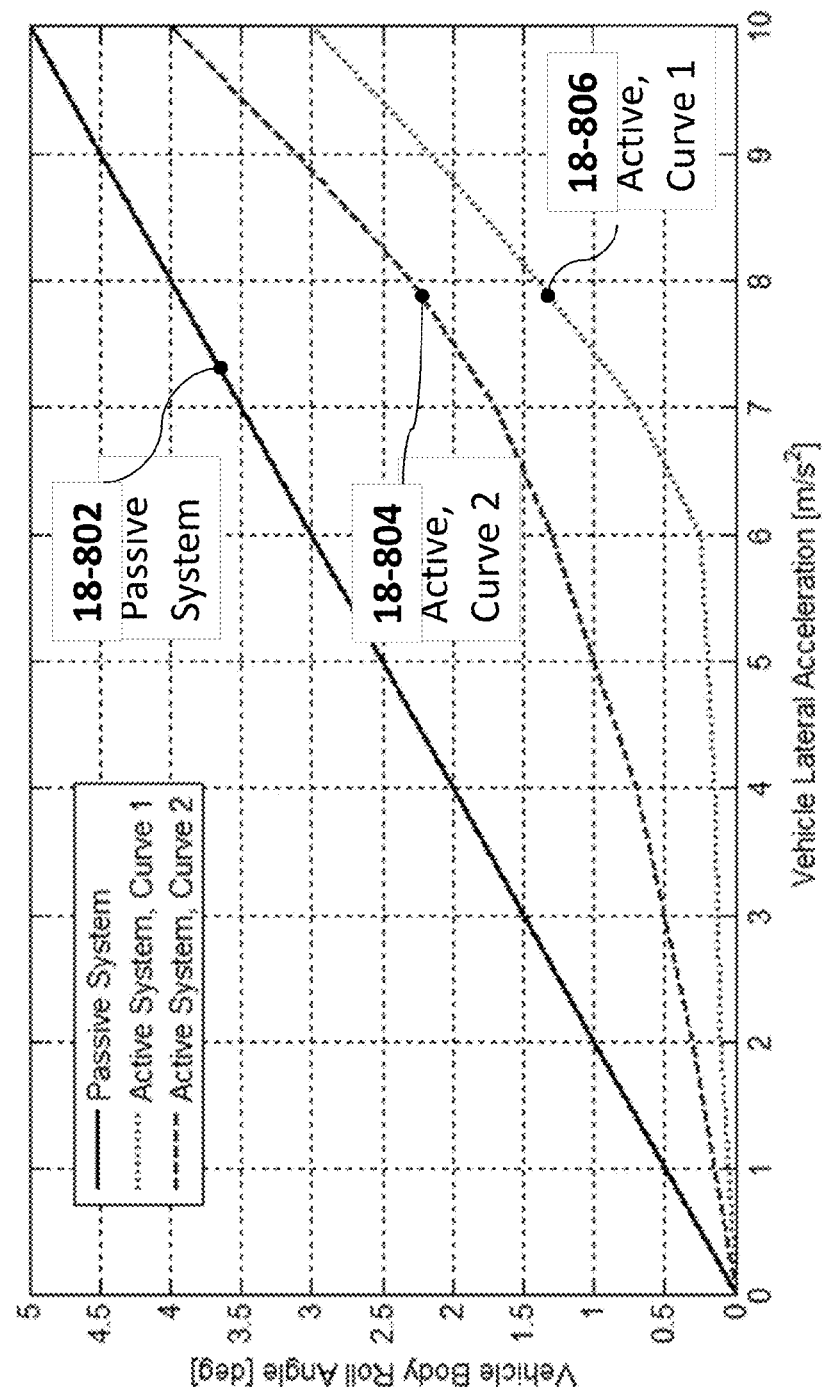
FIG. 8 shows a steady-state roll angle as a function of steady-state lateral acceleration for a passive vehicle and two active curves that are part of a situational active control method.

FIG. 8 shows examples of the steady-state roll angle of the vehicle body in a passenger vehicle as a function of the steady-state lateral acceleration of the vehicle. A typical passive vehicle may have a response that is governed by springs and thus fairly linear as a function of lateral acceleration. This is shown in curve 18-802. The active suspension algorithm initially responds with a desired roll angle curve that for example may follow a relatively flat curve, and become steeper at higher lateral accelerations due to force limiting in the active suspension system. This curve may look like curve 18-806. Once the roll bleed algorithm has been active for some time, and the system has reached the desired steady-state value at which power consumption is lower, the steady state result might trend to a curve like the one shown in 18-804.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method for reducing energy consumption in an active vehicle suspension system, comprising:
   calculating a desired control command for a vehicle maneuver;
   applying an actual force command to the active vehicle suspension system, wherein the actual force command is equal to or less than the desired control command; and
   reducing energy consumption by the active suspension system during the maneuver by decreasing the actual force command from a first value to a second value.

2. The method of claim 1, wherein:
   the actual force command begins with the first value and follows at least one change in the desired control command for a first period of time subsequent to the change;
   the actual force command then decreases during a second period subsequent to the first period; and
   the actual force command then decreases to the second value which is a value that is lower than the desired control command.

3. The method of claim 2, wherein the desired control command is calculated based on sensed or estimated vehicle inertial force roll moment.

4. The method of claim 2, wherein the energy consumed by the active vehicle suspension system at the second value is less than or equal to an energy consumption target threshold.

5. The method of claim 2, wherein during the first period the actual force command follows changes in the desired control command fully or partially.

6. The method of claim 2, wherein the active suspension uses a multitude of electro-hydraulic actuators.

7. The method of claim 1, wherein the first value is equal to the desired control command at the start of the first period.

8. The method of claim 7, wherein the desired control command meets a desired benefit threshold for the vehicle maneuver.

9. The method of claim 8, wherein the second value meets an acceptable benefit threshold for the vehicle maneuver.

10. The method of claim 1, wherein the actual force command is decreased from the first value to the second value at a rate slow enough such that is not detectable by a vehicle occupant.

11. The method of claim 1, wherein the desired control command maintains the vehicle roll angle below an initial roll response value.

12. A method for adjusting an active vehicle suspension system control algorithm, comprising:
   identifying an event selected from a group consisting of a vehicle event and a wheel event;
   computing a performance factor as a function of a tradeoff between intervention benefit and intervention cost for the event;
   reducing energy consumption of an active vehicle suspension system by adjusting at least one parameter of a control algorithm based on the performance factor, wherein the control algorithm controls at least one aspect of the active vehicle suspension system; and
   applying the adjusted control algorithm to the active vehicle suspension system during the event.

13. The method of claim 12, wherein the algorithm is adjusted before commencement of the event.

14. The method of claim 12, wherein the algorithm is adjusted after commencement of the event.

15. The method of claim 12, wherein the benefit is selected from the group consisting of safety and comfort.

16. The method of claim 12, wherein the cost is selected from the group consisting of peak power consumption, average power consumption, and total energy consumption.

17. The method of claim 12, wherein the event is selected from the group consisting of navigating a sharp turn, transitioning between a road and a driveway, and transitioning a road bump.

18. The method of claim 12, wherein the event is navigating a turn and a first desired roll angle is calculated that requires a first level of power consumption to maintain, and a second roll angle is calculated that produces a reduced benefit but requires a second lower level of power consumption to maintain, wherein the algorithm commands the active vehicle suspension system to maintain the first roll angle for a first period during the turn and to transition the active vehicle suspension system to the second roll angle during a second period during the turn.

19. A method for controlling an active vehicle suspension system, the method comprising:
  detecting a vehicle event;
  analyzing the vehicle event to determine whether the active suspension system can be used to deliver a benefit to an occupant of the vehicle during at least one portion of the vehicle event;
  determining an amount of energy required for delivering the benefit to the occupant during the at least one portion of the vehicle event;
  comparing the required energy to the benefit to determine if the active vehicle suspension should be controlled to deliver the benefit; and
  intervening with the active vehicle suspension to deliver the benefit if it is determined that the benefit should be delivered.

20. The method of claim 19, wherein the benefit is selected from the group consisting of increased comfort, increased safety and increased stability.

21. The method of claim 19, wherein the vehicle event is detected before commencement of the event.

22. The method of claim 19, wherein the vehicle event is detected after commencement of the event.

23. The method of claim 19, wherein analyzing the vehicle event comprises comparing the vehicle event to previously analyzed vehicle events.

24. The method of claim 19, wherein determining an amount of energy needed for delivering the benefit is based at least partially on past vehicle events.

25. The method of claim 19, wherein determining an amount of energy needed for delivering the benefit is based on a model.

26. The method of claim 25, wherein the vehicle event is a wheel event.

27. The method of claim 25, wherein the model is predictive.

28. The method of claim 19, wherein analyzing the vehicle event to determine whether the active suspension system can be used to deliver the benefit comprises determining if the vehicle event is above a perception threshold of the occupant.

29. The method of claim 19, further comprising determining an amount of power needed for delivering the benefit to the occupant during at least a portion of the vehicle event, comparing the required power to the benefit to determine if the active vehicle suspension should be controlled to deliver the benefit, and controlling the active vehicle suspension to deliver the benefit if it is determined that the benefit should be delivered.

30. The method of claim 29, wherein the predictive model uses GPS information to obtain road data.

31. The method of claim 19, wherein the occupant is selected from the group consisting of a driver, a person, an instrument and a weapon system.

32. A method for operating an active vehicle suspension system, the method comprising:
  determining an amount of energy required by the active suspension system to deliver a benefit to an occupant during at least one portion of a vehicle event; and
  controlling the active suspension system to intervene with the vehicle event during the at least one portion of the vehicle event when the resulting benefit due to the intervention is above a first threshold.

33. The method of claim 32 further comprising operating in an energy-efficient mode when the resulting benefit due to the intervention is below a second threshold.

34. The method of claim 33, wherein the first threshold is equal to the second threshold.

35. The method of claim 33, wherein the resulting benefit is selected from the group consisting of increased safety, increased comfort, and increased stability.

36. A method for reducing energy consumption in an active vehicle suspension system, the method comprising:
  operating an active suspension system in a first mode during a first portion of at least one of a road event and a vehicle event at a first level of performance to produce a first level of benefit; and
  operating the active suspension system in a second mode during a second portion of the at least one of the road event and the vehicle event at a second level of performance to produce a second level of benefit.

37. The method of claim 36, wherein the second level of performance provides higher energy efficiency relative to the first level of performance and the second level of benefit provides less comfort relative to the first level of benefit.

38. The method of claim 36, wherein the second level of performance provides higher energy efficiency relative to the first level of performance and the second level of benefit results in increased roll angle relative to the first level of benefit.

39. The method of claim 36, wherein the at least one of the road event and the vehicle event is selected from the group consisting of a vehicle emergency situation and a vehicle maneuver that causes increased occupant discomfort.

40. The method of claim 36, wherein the vehicle event is the vehicle negotiating a turn.

* * * * *